(12) United States Patent
Jagana et al.

(10) Patent No.: US 9,762,657 B2
(45) Date of Patent: Sep. 12, 2017

(54) AUTHENTICATION OF MOBILE APPLICATIONS

(71) Applicant: International Business Machines Corporation, Armonk, NY (US)

(72) Inventors: Venkata R. Jagana, Austin, TX (US); Alwyn R. Lobo, Bangalore (IN); Gopinath Rajagopal, Bangalore (IN); Parvatina Rambabu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 14/306,301

(22) Filed: Jun. 17, 2014

(65) Prior Publication Data

US 2015/0365407 A1 Dec. 17, 2015

(51) Int. Cl.
*G06F 21/00* (2013.01)
*H04L 29/06* (2006.01)
(Continued)

(52) U.S. Cl.
CPC .......... *H04L 67/10* (2013.01); *H04W 4/001* (2013.01); *H04W 12/12* (2013.01)

(58) Field of Classification Search
CPC ...... H04L 63/089; H04L 67/10; H04W 4/001; H04W 12/12
See application file for complete search history.

(56) References Cited

U.S. PATENT DOCUMENTS 5,966,715 A   10/1999   Sweeney et al.
7,065,746 B2   6/2006   Szabo et al.
(Continued)

FOREIGN PATENT DOCUMENTS

WO   WO 2015017581 A1 *   2/2015   .......... H04L 63/168

OTHER PUBLICATIONS

Wipawee Nayam, Arguy Laolee, Luck Charoenwatana, Kunwadee Sripanidkulchai; "An analysis of mobile application network behavior"; Nov. 2016; AINTEC '16: Proceedings of the 12th Asian Internet Engineering Conference; Publisher: ACM; pp. 9-16.*
(Continued)

*Primary Examiner* — Fatoumata Traore
*Assistant Examiner* — Courtney Fields
(74) *Attorney, Agent, or Firm* — Ronald A. Kaschak; Matthew M. Hulihan; Heslin Rothenberg Farley & Mesiti PC

(57) ABSTRACT

Embodiments of the present invention provide a system, method and computer program product for authenticating a mobile application. According to one embodiment the method comprises registering, by a computer processor of a computer system, the mobile application, wherein the registration includes receiving and storing information associated with the mobile application, receiving, by the computer processor, one or more application details associated with the mobile application from a computing device, comparing, by the computer processor, the received one or more application details associated with the mobile application with the stored information associated with the mobile application, generating, by the computer processor, a notification based on the comparison to indicate authenticity of the mobile application and sending the notification to the computing device.

18 Claims, 4 Drawing Sheets

(51) Int. Cl.
  *H04L 29/08* (2006.01)
  *H04W 12/12* (2009.01)
  *H04W 4/00* (2009.01)
  *G06F 21/50* (2013.01)
  *H04W 12/10* (2009.01)

(56) References Cited

U.S. PATENT DOCUMENTS

| | | | |
|---|---|---|---|
| 7,137,101 B1 | 11/2006 | Ehnebuske et al. | |
| 7,739,514 B2 | 6/2010 | Bangui | |
| 7,890,427 B1 | 2/2011 | Rao et al. | |
| 8,126,963 B1* | 2/2012 | Rimmer | H04L 63/0823 709/203 |
| 8,156,488 B2 | 4/2012 | Kotamarthi et al. | |
| 8,335,792 B2 | 12/2012 | Britton et al. | |
| 2009/0111583 A1 | 4/2009 | Zalewski et al. | |
| 2009/0328144 A1* | 12/2009 | Sherlock | G06F 21/10 726/2 |
| 2013/0074168 A1* | 3/2013 | Hao | H04L 9/3213 726/7 |
| 2013/0078947 A1 | 3/2013 | Pecen et al. | |
| 2013/0078949 A1* | 3/2013 | Pecen | H04L 63/101 455/411 |
| 2013/0283377 A1* | 10/2013 | Das | G06F 21/51 726/23 |
| 2013/0346268 A1* | 12/2013 | Pereira | G06Q 10/10 705/34 |
| 2014/0007222 A1* | 1/2014 | Qureshi | G06F 21/10 726/16 |
| 2014/0150096 A1* | 5/2014 | Moon | G06F 21/645 726/22 |
| 2014/0359098 A1* | 12/2014 | Xu | H04L 67/10 709/223 |

OTHER PUBLICATIONS

"Security for Mobile Applications, Protecting your Mobile Apps"; http://www.arxan.com/products/mobile/; 2 pgs., copyright 2014 Arxan Technologies, Inc.

* cited by examiner

AUTHENTICATION OF MOBILE APPLICATIONS

TECHNICAL FIELD

The present invention relates to mobile applications, and more specifically, to authentication of mobile applications.

BACKGROUND OF THE INVENTION

The proliferation of mobile devices and the capabilities these offer today for performing business functions is driving the mid to large enterprises to support their own mobile application portals. For example, these enterprises are now providing mobile applications to do business functions like taking orders, purchasing goods and services, doing banking transactions, viewing product information, locating a store etc. These enterprise mobile applications are typically not provided through public application stores like Apple Store or Google Application store but through their own private application store or from a downloadable hyper text transfer protocol (HTTP) site.

When a mobile application is downloaded from a downloadable HTTP site through an invitation link received on a mobile device through short messaging service (SMS), multimedia messaging service (MMS), email or mobile based messaging applications, there is a possibility that the received invitation link may not be genuine. Such a link may be deliberately provided by rogue elements to lead a mobile device user to download a non-genuine application or download the mobile application from a compromised site or to download a contaminated application.

SUMMARY

According to embodiments of the present invention, there is provided a system, a computer program product and a method for authenticating a mobile application. According to one embodiment the method comprises registering, by a computer processor of a computer system, a mobile application, wherein the registration includes receiving and storing information associated with the mobile application, receiving, by the computer processor, one or more application details associated with the mobile application from a computing device, comparing, by the computer processor, the received one or more application details associated with the mobile application with the stored information associated with the mobile application, generating, by the computer processor, a notification based on the comparison to indicate authenticity of the mobile application and sending the notification to the computing device.

DETAILED DESCRIPTION

Figure 1:
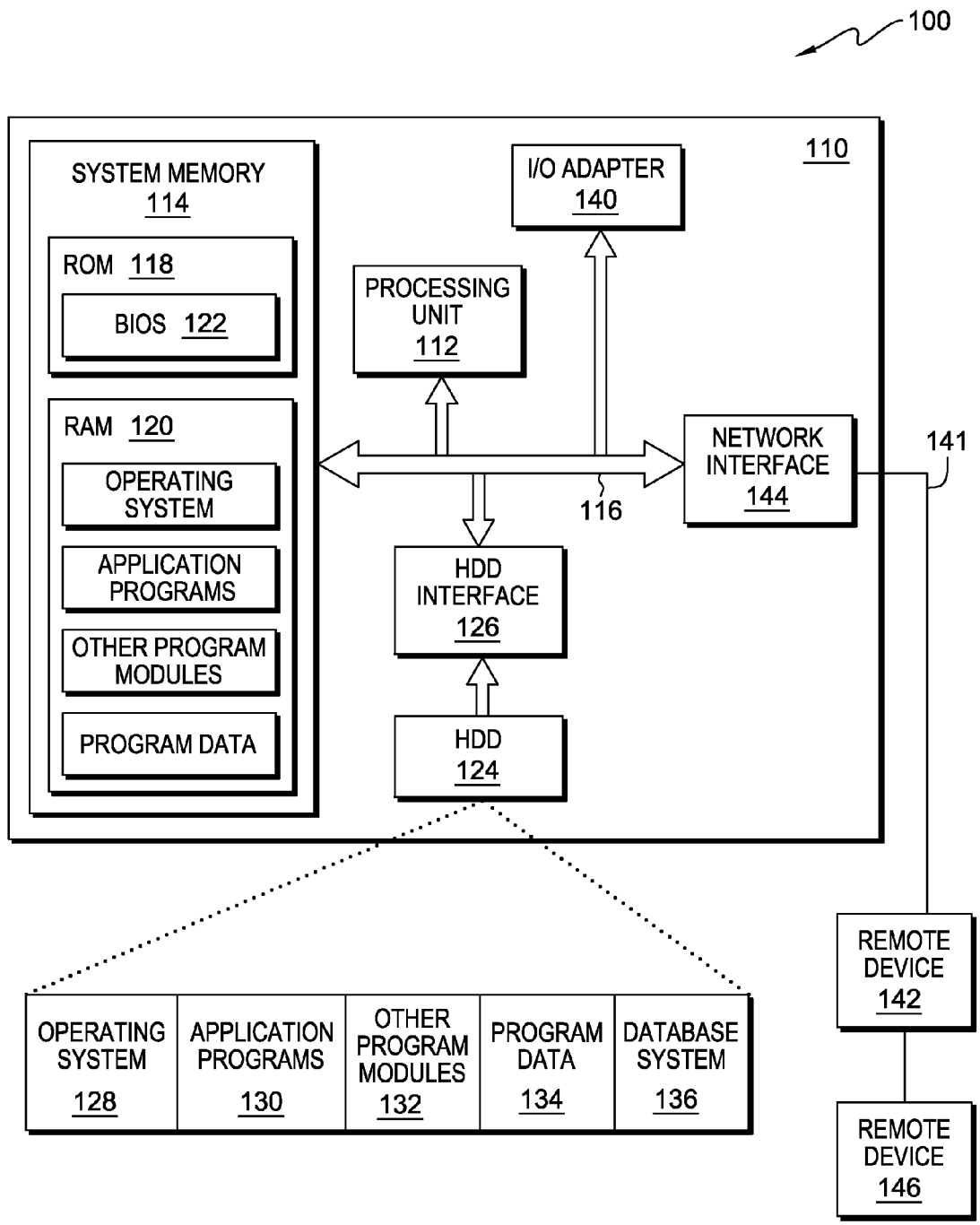
FIG. 1 shows an exemplary computer system which is applicable to implement the embodiments of the present invention.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware embodiments that may all generally be referred to herein as a "circuit," "module" or "system". Furthermore, embodiments of the present invention may take the form of a computer program product, embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a block diagram of a computing system for implementing an embodiment of the present invention. The computing system 100 includes a computing device 110, which in turn includes a processing unit 112, a system memory 114, and a system bus 116 that couples various system components including the system memory 114 to the processing unit 112. The system bus 116 may be any of several types of bus architectures, including a memory bus, a memory controller, a peripheral bus, and a local bus using any of a variety of bus architectures, such as peripheral component interconnect (PCI). The system memory 114 includes a Read Only Memory (ROM) 118 and a Random Access Memory (RAM) 120. A Basic Input/Output System (BIOS) 122, containing the basic routines that help to transfer information between elements within the computing device 110, such as during start-up, is stored in the ROM 118. The computing device 110 further includes a Hard Disk Drive (HDD) 124 as computer-readable storage media. The HDD 124 is connected to the system bus 116 by an HDD interface 126. The HDD 124 provides a non-volatile storage for computer-readable instructions, data structures, program modules, and other data for the computing device 110. Although the exemplary environment described herein employs the HDD 124, it should be appreciated by those skilled in the art that other types of computer-readable storage media, which can store data that is accessible by computer, such as RAM, ROM, removable magnetic disks, removable optical disks, and the like may also be used in the exemplary operating environment.

A number of program modules may be stored on the HDD 124, including an operating system 128, one or more application programs 130, other program modules 132, program data 134, and a database system 136. The operating system 128, the one or more application programs 130, the other program modules 132 and program data 134 may be loaded onto the system memory 114 and specifically onto the RAM 120 during the functioning of the computing device 110. A user may provide commands and information through input devices, such as a keyboard, and receive output through peripheral output devices, such as monitor, speaker, printer, etc. These input and output devices are often connected to the processing unit 112 through an I/O adapter 140 coupled to the system bus 116.

In a networked environment, the computing device 110 may be connected to a remote computing device 142 through a network interface card 144. It will be appreciated that the network connections shown are exemplary, and any conventional means 141 of establishing communication links between the computers, such as a local area network, wide are network or wireless connection may be used. In a networked environment, program modules depicted relative to the computing device 110, or its components, may be stored in a remote memory 146. The remote computing device 142 may be a personal computer, a router, a server, a network PC, a peer device, or other common network device.

Those of the ordinary skill in the art will appreciate that the hardware in FIG. 1 is a basic computing system and may vary. The architecture of the aforementioned computing device is not limiting and is only depicted as an example on which an embodiment of the present invention may be implemented. Other types of computing system such as a smart phone or a web-kiosk are well within the intended scope on which an embodiment of the present invention may be implemented.

Figure 2:
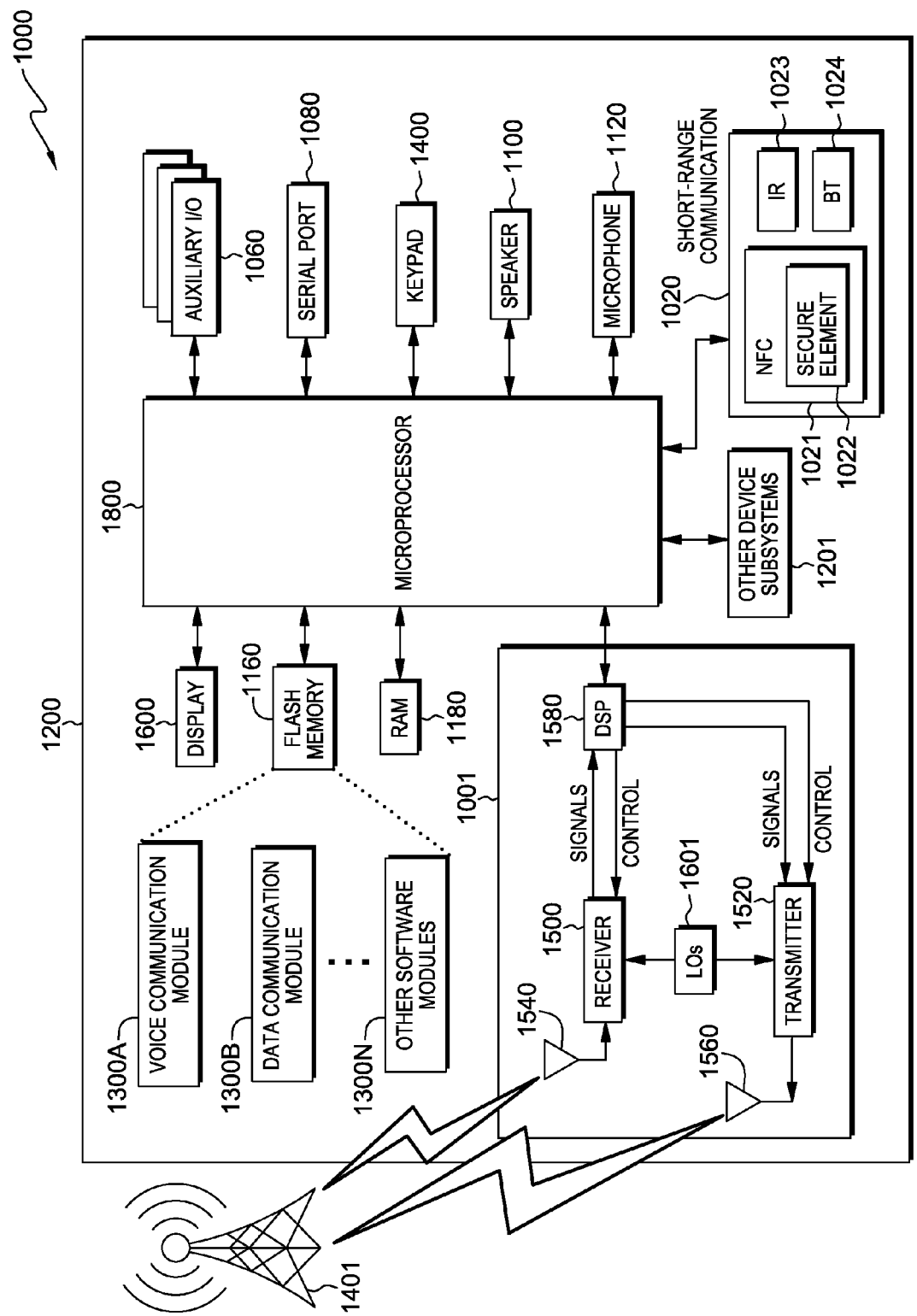
FIG. 2 depicts an exemplary block diagram illustrating example components of a mobile device that may be used to implement an embodiment of the invention.

FIG. 2 is a schematic block diagram illustrating example components of a mobile device that may be used to implement an embodiment of the invention. The mobile device 1000 illustratively includes a housing 1200, a keyboard or a keypad 1400 and an output device 1600. The output device shown is a display 1600, which may comprise a full graphic liquid crystal display (LCD). Other types of output devices may alternatively be utilized. A processing device, microprocessor 1800 is provided within the housing 1200 and is coupled between the keypad 1400 and the display 1600. The microprocessor 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

In addition to the microprocessor 1800, other parts of the mobile device 1000 are shown schematically in FIG. 2. These include a communication subsystem 1001, a short-range communication subsystem 1020, and other input/output devices 1060, 1080, 1100 and 1120; as well as memory devices 1160, 1180 and various other device subsystems 1201. The communication subsystem 1001 may be configured for two-way RF communication having data and, optionally, voice communication capabilities. In addition, the mobile device 1000 may have the capability to communicate with other computer systems via the Internet.

Operating system software executed by the microprocessor 1800 is stored in a persistent storage, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communication signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communication modules 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a communication network 1401. The PIM data items may be seamlessly integrated, synchronized and updated via the communication network 1401 with corresponding data items stored or associated with a host computer system.

Communication functions, including data and voice communication, are performed through the communication subsystem 1001, and possibly through the short-range communication subsystem 1020. The communication subsystem 1001 includes a receiver 1500, a transmitter 1520, and one or more antennas 1540 and 1560. In addition, the communication subsystem 1001 also includes a processing module, such as a digital signal processor (DSP) 1580, and local oscillators (LOs) 1601. The specific design and implementation of the communication subsystem 1001 is dependent upon the communication network in which the mobile device 1000 is intended to operate. For example, a mobile device 1000 may include a communication subsystem 1001 designed to operate with the General Packet Radio Service (GPRS) mobile data communication networks, and also designed to operate with any of a variety of voice communication networks, such as Advance Mobile Phone System (AMPS), Time Division Multiple Access (TDMA), Code Division Multiple Access (CDMA), Wideband Code Division Multiple Access (WCDMA), Personal Communications Service (PCS), Global System for Mobile (GSM), Enhanced Data Rates for GSM Evolution (EDGE), etc. Other types of data and voice networks, both separate and integrated, may also be utilized with the mobile device 1000. The mobile device 1000 may also be compliant with other communication standards such as 3GSM, $3^{rd}$ Generation Partnership Project (3GPP), and Universal Mobile Telecommunications System (UMTS), etc.

Network access requirements vary depending upon the type of communication system. For example, in GPRS networks, network access is associated with a subscriber or user of a device. A GPRS device therefore typically involves use of a subscriber identity module, commonly referred to as a Subscriber identity Module (SIM) card, in order to operate on a GPRS network.

When required network registration or activation procedures have been completed, the mobile device 1000 may send and receive communication signals over the communication network 1401. Signals received from the communication network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communication functions, such as demodulation and decoding. In a similar manner, signals to be transmitted to the communication network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communication signals, the DSP 1580 provides for control of the receiver 1500 and the transmitter 1520. For example, gains applied to communication signals in the receiver 1500 and transmitter 1520 may be adaptively controlled through automatic gain control algorithms implemented in the DSP 1580.

In a data communication mode, a received signal, such as a text message or web page download, is processed by the communication subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communication network 1401 via the communication subsystem 1001.

In a voice communication mode, overall operation of the device is substantially similar to the data communication mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communication mode, for example to display the identity of a calling party, the duration of a voice call, or other voice call related information.

The short-range communication subsystem 1020 may include Near field communication (NFC) 1021 capability. NFC 1021 capability includes a secure element 1022 therein to securely store applications and/or credentials and provide for secure execution of applications. The secure element 1022 (secure memory and execution environment) is a dynamic environment in which application code and application data can be securely stored and administered and in which secure execution of applications occur. The secure element 1022 resides in highly secure crypto chips (usually a smart card chip). The secure element 1022 provides delimited memory for each application and other functions that can encrypt, decrypt, and sign the data packet. The secure element 1022 could be implemented either by a separate secure smart card chip (currently implemented in most of the NFC mobile devices), in the SIM/Universal Integrated Circuit Card (UICC) (which is used by GSM mobile phone operators to authenticate subscribers on their networks and maintain personalized subscriber information and applications), or in an Secure Digital (SD) card that can be inserted in the mobile device. The secure element 1022 implementation approach is selected by the mobile operator implementing the service and/or by the payment service provider (for SD card implementations). The short-range communication subsystem 1020 may also comprise an infrared (IR) device 1023 and associated circuits and components and a Bluetooth™ (BT) communication module 1024 to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

Those of the ordinary skill in the art will appreciate that the hardware in FIG. 2 is a basic mobile device and may vary. The architecture of the aforementioned basic mobile device is not limiting and is only depicted as an example on which an embodiment of the present invention may be implemented.

Figure 3:
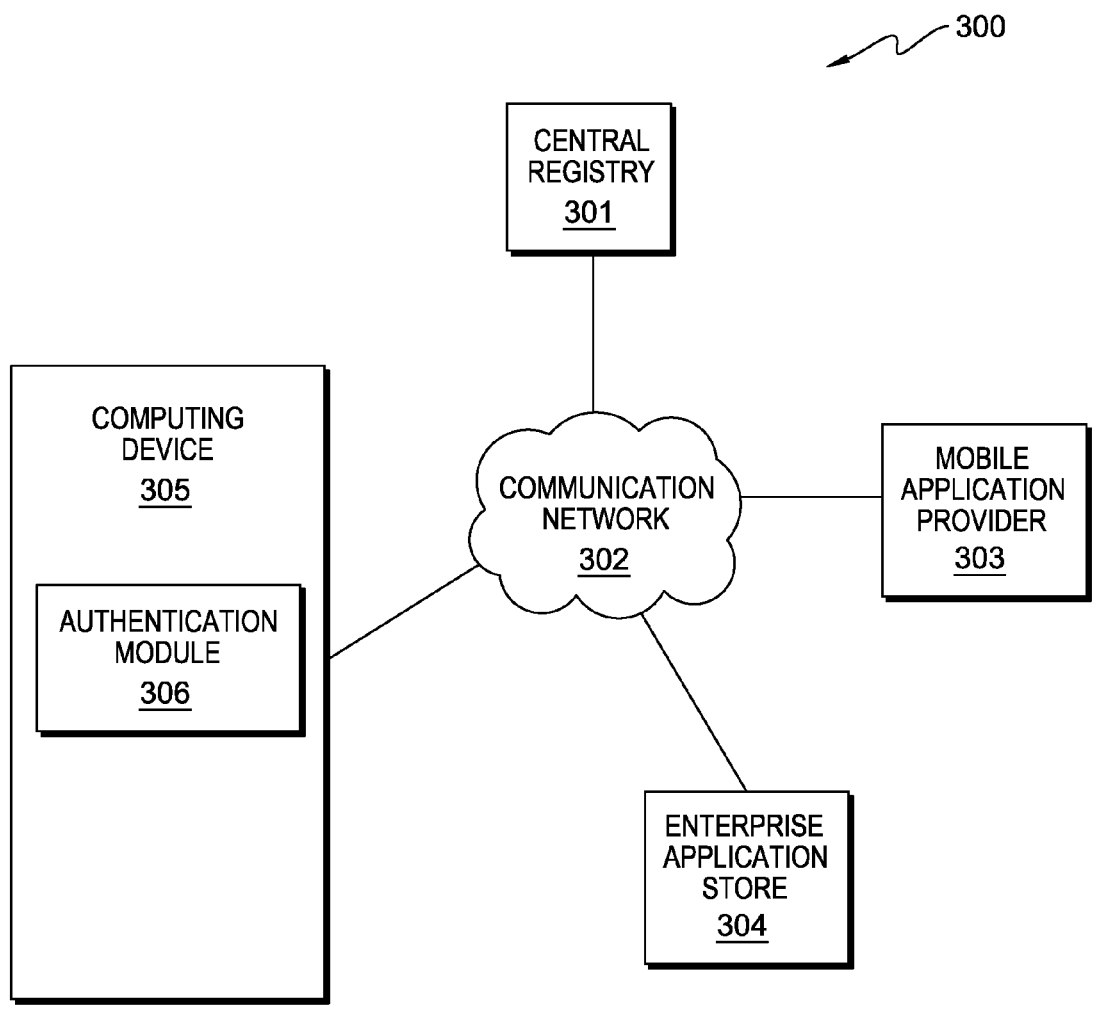
FIG. 3 depicts an exemplary block diagram of a system for protecting a mobile device from non-trusted mobile applications.

FIG. 3 depicts an exemplary block diagram of a system 300 for authenticating a mobile application in accordance with aspects of the present invention. As shown in the example of FIG. 3, the system 300 comprises a central registry 301, a mobile application provider 303, an enterprise application store 304 and a computing device 305. The central registry 301, the mobile application provider 303 and the enterprise application store 304 may each be a computer system (e.g., the computer 100 in FIG. 1) capable of communicating with the mobile device 1000 through a communication network 302. The computing device 305 may be a mobile device (e.g., the mobile device 1000 in FIG. 2), a tablet computer, a handheld device, and the like. The communication network 302 may be any type of known network including wired or wireless, but not limited to, an Over the Network (OTA) of a Mobile Network Operator (MTO), a wide area network (WAN), a public switched telephone network (PSTN) a local area network (LAN), a global network (e.g. Internet), a virtual private network (VPN), and an intranet. The communication network 302 may be implemented using a wireless network or any kind of physical network implementation known in the art.

The central registry 301 is a repository configured to store therein information associated with one or more mobile applications provided by respective mobile application provider 303. According to one embodiment of the present invention, the information associated with the mobile application may include, a first unique identity identifying the mobile application provider uniquely, a second unique identity identifying the mobile application uniquely, a version number of the mobile application, a build number of the mobile application and a checksum of the mobile application. The mobile application provider 303 uploads the mobile application to the enterprise application store 304 and the mobile application may be downloaded at the computing device 305 by accessing the enterprise application store 304. The mobile application provider 303 may also register the mobile application with the central registry 301 by providing the information associated with the mobile application to the central registry 301. According to one embodiment of the present invention, the information may be provided in a predetermined format prescribed by the central registry 301. On receiving the information, the central registry 301 is configured to store the information corresponding to the mobile application. The registration of the mobile application by the mobile application provider 303 at the central registry 301 may be done through various means. For example, the mobile application provider 303 may register the mobile application at the central registry 301 via a web portal accessible through the communication network 302. The term mobile application referred to herein may include an application for computing devices, such as, a mobile device, a tablet computer, a handheld device and the like.

The mobile application provider 303 may send, to the computing device 305, an invitation having an indication of a source from where the mobile application may be downloaded. For example, the source may be indicated via a uniform resource locator (URL) or a link. The application provider 303 may send the invitation to the computing device 305 via the communication network 302. The notification may be sent as a SMS, MMS, email, instant messaging service, mobile based message service and the like. For example, the enterprise application store 304 may be indicated as the source for downloading the mobile application.

The computing device 305 is configured to receive the notification and the mobile application may be downloaded at the computing device 305 from the source indicated in the notification, for example, the enterprise application store 304. The computing device 305 may display the notification on a display and the user may initiate the downloading of the mobile application by selecting the link or the URL. For example, in aspects where the computing device 305 is a mobile device, the notification may be displayed on a display (e.g., the display 1600 in FIG. 2). The selection of the link or the URL may be provided as an input by the user. According to one embodiment of the present invention, the enterprise application store 304 may be a server managed by the mobile application provider 303. In another embodiment, the enterprise application store 304 may be a server managed by a third party and the mobile application provider 303 may host the mobile application on the enterprise application store 304 managed by the third party. On the downloading of the mobile application being initiated, the computing device 305 is configured to download the mobile application and store the downloaded mobile application in a memory (e.g., the flash memory 1160 in FIG. 2 for a mobile device). According to one embodiment of the present invention, the mobile device 1000 computing device 305 may comprise an authentication module 306 for verifying the authenticity of the mobile application. The authentication module 306 may be a mobile application or software script within an operating system of the computing device 305 configured to run natively within the computing device 305. The authentication module 306 may be configured to get activated within the computing device 305 whenever an installation of a mobile application is initiated within the environment of the computing device 305. According to one embodiment of the present invention, upon activation, the authentication module 306 may be configured to initiate the authentication of the downloaded mobile application before the installation of the mobile application.

According to another embodiment, the authentication module 306 may be configured to seek the permission of the user of the computing device 305 before initiation of the authentication. For example, the authentication module 306 may pop up a display message on the display of the computing device 305 seeking the mobile device 1000 user's permission. Since the computing device 305 user may often click URLs not pertaining to download of a mobile application while browsing through the internet network on the computing device 305, the frequent pop-ups from the authentication module 306 may prove to be irritant to the computing device 305 user. To overcome this, various methods known to a person skilled in the art may be used. For example, when the computing device 305 user clicks on a website URL www.xyz.com, the authentication module 306 along with the pop up message may provide an option to the computing device 305 user to not pop up any message in respect of any URL which contains www.xyz.com or a part thereof. Alternatively, the authentication module 306 may be configured to be activated only when the user of the computing device 305 clicks a URL within a specific application environment of the computing device 305, such as, within the messaging environment of the computing device 305. Thus, when the computing device 305 user clicks a URL within a browsing environment, such as, a web browser within the computing device 305, the authentication module 306 may not get activated thereby alleviating the aforementioned problem. These and other such techniques may be used to train the authentication module 306 or customize a use thereof. The computer program code of the authentication module 306 incorporating any configuration such as the one aforementioned may be developed by any person skilled in the art.

To authenticate the downloaded mobile application, the authentication module 306 may be configured to provide one or more application details associated with the mobile application to the central registry 301. The application details may include a first unique identity identifying the mobile application provider uniquely, a second unique identity identifying the mobile application uniquely, a version number of the mobile application, a build number of the mobile application and a checksum of the mobile application. The application details, such as, the first unique identity identifying the mobile application provider uniquely, the second unique identity identifying the mobile application uniquely, the version number of the mobile application and the build number of the mobile application may be extracted by the authentication module 306 from the downloaded mobile application. The checksum of the mobile application may be computed by the authentication module 306. The application details may be provided to the central registry 301 via the communication network 302.

The central registry 301 is configured to receive the application details corresponding to a mobile application transmitted by the mobile device 1000. On receiving the application details, the central registry 301 is configured to identify the information corresponding to the mobile application stored in its repository. For example, the central registry 301 may identify the information in a hierarchical manner using the first unique identify identifying the mobile application provider and the second unique identity identifying the mobile application. The central registry 301 is configured to compare the fields of the application details with the fields of the information and generate a notification based on the comparison to indicate if the mobile application is authentic. The central registry 301 may be configured to generate the notification such that it indicates that the mobile application is authentic if the fields of the application details match with the fields of the information. If the fields do not match, the central registry 301 may generate the notification to indicate that the mobile application is not authentic.

The central registry 301 is configured to send the generated notification to the computing device 305. On receipt of the notification, the mobile application may be installed based on the indication provided by the notification. According to one embodiment, if the notification indicates the mobile application to be authentic, the computing device 305 may initiate the installation of the mobile application. If the indication indicates the mobile application to not be authentic, the computing device 305 may not install the mobile application. According to another embodiment of the present invention, the computing device 305 may display the notification to the user by displaying the notification on the display. Thereafter, the user may make a decision whether or not to install the mobile application. According to one embodiment of the present invention, if the mobile application is indicated as, not authentic by the notification, the computing device 305 may be configured to delete the stored mobile application from the memory.

According to one embodiment of the present invention, the authentication module may be configured to verify the authenticity of the mobile application each time the mobile application is run on the computing device 305. When an input from the user is received for running a mobile application, the authenticator module 306 may be configured to send the application details to the central registry 301 for verifying the authenticity of the mobile application. The mobile application may be run only after the receipt of the notification indicating that the mobile application is authentic from the central registry 301.

According to one embodiment of the present invention, the mobile application provider 303 may register with the central registry 301, the information of the source which will be sent with the notification to the mobile device 1000 for downloading the mobile application. The authentication module 306 may be activated when the source is selected for downloading the mobile application. As described previously, the source may be provided as a link or a URL. According to one embodiment of the present invention, the authentication module 306 may be configured to verify the authenticity of the source from where the mobile application may be downloaded before the downloading of the mobile application at the computing device 305. The authentication module 306 may send the information of the source received by the computing device 305 with the notification to the central registry 301. On receiving the information of the source sent by the computing device 305, the central registry 301 may compare with the received information of the source with the stored information of the source. The central registry 301 may be configured to generate a notification based on the comparison. The notification may be generated such that it indicates the information of the source to be authentic if the received information of the source matches with the stored information of the source. If they do not match, the notification may be generated such that it indicates that the information of the source for downloading the mobile application is not authentic. The notification generated by the central registry 301 may be sent to the computing device 305. On the receipt of the notification at the computing device 305, the mobile application may be downloaded in the notification indicates the information of the source to the authentic. According to one embodiment of the present invention, the authentication module 306 may be configured to initiate the downloading of the mobile application if the notification indicates the source to be authentic. In another embodiment, the notification may be displayed on the display of the computing device 305 and the user may initiate the downloading based on the notification by providing an input.

Figure 4:
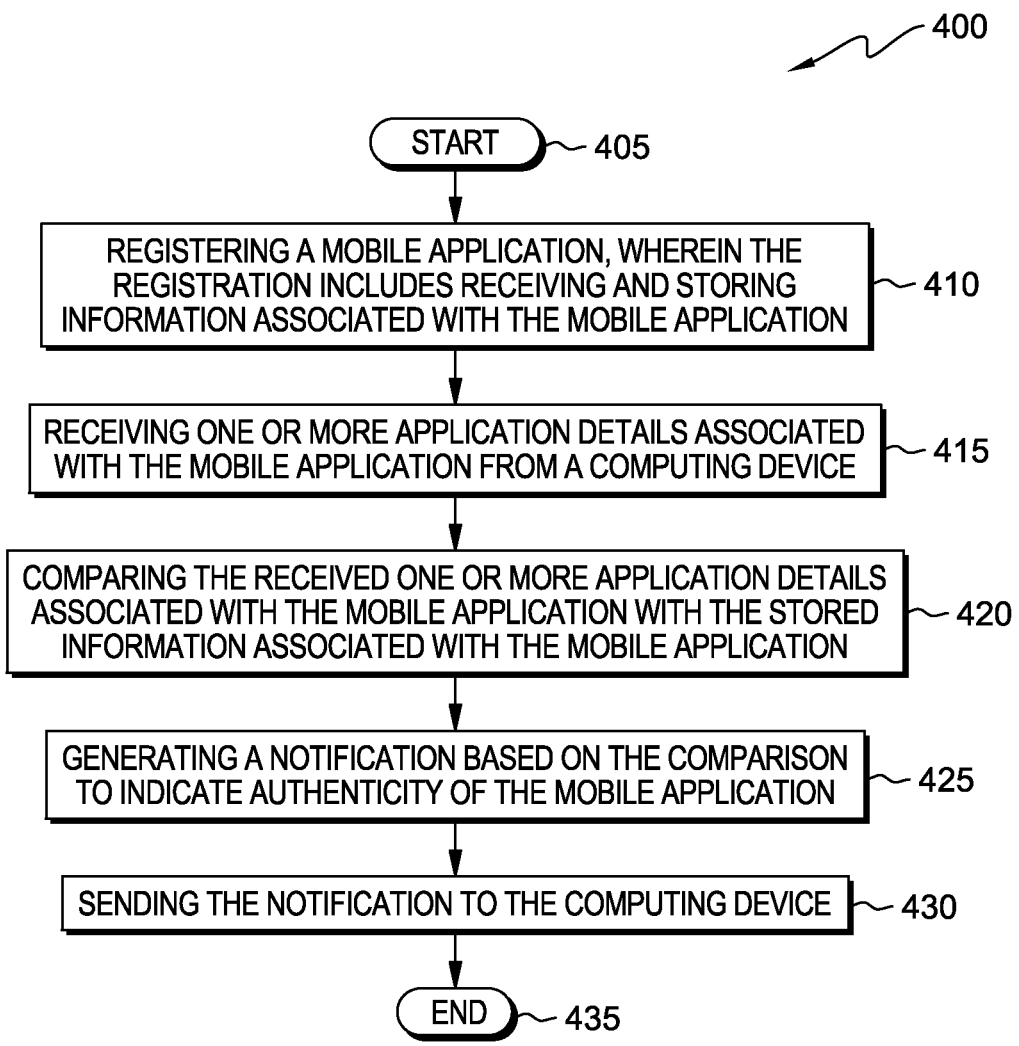
FIG. 4 depicts an exemplary flow process in accordance with aspects of the present invention.

FIG. 4 depicts an exemplary flow for a process 400 in accordance with aspects of the present invention. In embodiments, the process 400 can be performed by the central registry 301 in FIG. 3.

At step 405, the process starts. At step 410, a mobile application may be registered at a central registry (e.g., the central registry 301 in FIG. 3). The registration may include receiving and storing information associated with the mobile application. A mobile application provider (e.g., the mobile application provider 303 in FIG. 3) may register the mobile application at the central registry. At step 415, the central registry receives application details associated with the mobile application downloaded at a computing device (e.g., the computing device 305 in FIG. 3). The computing device may be configured to send the application details associated with the downloaded mobile application to the central registry. At step 420, the central registry compares the received application details associated with the mobile application with the stored information associated with the mobile application. At step 425, the central registry is configured to generate a notification based on the comparison to indicate authenticity of the mobile application. For example, the central registry may compare the respective fields of the application details with the respective fields of the stored information. At step 430, the central registry sends the notification to the computing device. At step 435, the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described herein provide enable authenticating mobile applications used in mobile devices. As the authenticity of the mobile application is verified, contaminated, infected or a malicious mobile application may be prevented from being installed at the mobile device. Additionally, the usage of an infected or contaminated mobile application may not be prevented as the authenticity of the mobile application may be verified at each instance of the mobile application is run. Moreover, downloading of a contaminated, infected or a malicious mobile application may be prevented as the source of the mobile application may be verified prior to the download. The central registry may be managed by the mobile application provider or by a third party. A certification agency can be the third party for certifying the authenticity of the mobile application through the notification provided to the mobile device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of indicating mobile application authenticity, the method comprising:
    registering, by a computer processor of a computer system, an authentic mobile application, wherein the registration includes receiving and storing information associated with the authentic mobile application, and wherein the computer system comprises a central registry for mobile applications;
    receiving, by the computer processor, from a computing device, one or more application details associated with a subject mobile application for which authenticity is to be indicated and installation is to be completed, the receiving being in association with the computing device downloading the subject mobile application from a source and prior to completion of installation of the subject mobile application, wherein the receiving the application details associated with the subject mobile application is based on presentation of an invitation to the computing device to download the subject mobile application from the source, activating an authentication module of the computing device, and triggering authentication of the subject mobile application with the central registry based on the computing device downloading the subject mobile application and initiating the installation thereof;
    comparing, by the computer processor, the received one or more application details associated with the subject mobile application with the stored information associated with the authentic mobile application, wherein a correlation between the received one or more application details associated with the subject mobile application and the stored information associated with the authentic mobile application indicates that the subject mobile application is authentic;
    generating, by the computer processor, a notification based on the comparison to indicate authenticity of the subject mobile application, in which the subject mobile application is indicated to be the authentic mobile application or indicated to not be the authentic mobile application, wherein the authenticity of the subject mobile application comprises authenticity of the subject mobile application as received by the computing device from the source; and
    sending, by the computer processor, the notification to the computing device.

2. The method of claim 1, wherein the information associated with the authentic mobile application is received from a mobile application provider.

3. The method of claim 1, wherein the information associated with the authentic mobile application comprises at least one of a first unique identity uniquely identifying a provider of the authentic mobile application, a second unique identity uniquely identifying the authentic mobile application, a version number of the authentic mobile application, a build number of the authentic mobile application and a checksum of the authentic mobile application.

4. The method of claim 1, wherein the one or more application details associated with the subject mobile application comprises at least one of a first unique identity uniquely identifying a provider of the subject mobile application, a second unique identity uniquely identifying the subject mobile application, a version number of the subject mobile application, a build number of the subject mobile application and a checksum of the subject mobile application.

5. The method of claim 1, further comprising using the one or more application details associated with the subject mobile application to identify the stored information associated with the authentic mobile application stored for use in the comparing.

6. The method of claim 1, wherein the generating of the notification based on the comparing to indicate whether the subject mobile application is the authentic mobile application comprises generating the notification to indicate the subject mobile application being authentic based on the one or more application details associated with the subject mobile application matching with the stored information associated with the authentic mobile application.

7. A system comprising:
a memory having computer readable instructions; and
a processor configured to execute the computer readable instructions to perform a method, the method comprising:
    registering an authentic mobile application, wherein the registration includes receiving and storing information associated with the authentic mobile application, and wherein the system comprises a central registry for mobile applications;
    receiving from a computing device one or more application details associated with a subject mobile application for which authenticity is to be indicated and installation is to be completed, the receiving being in association with the computing device downloading the subject mobile application from a source and prior to completion of installation of the subject mobile application, wherein the receiving the application details associated with the subject mobile application is based on presentation of an invitation to the computing device to download the subject mobile application from the source, activating an authentication module of the computing device, and triggering authentication of the subject mobile application with the central registry based on the computing device downloading the subject mobile application and initiating the installation thereof;
    comparing the received one or more application details associated with the subject mobile application with the stored information associated with the authentic mobile application, wherein a correlation between the received one or more application details associated with the subject mobile application and the stored information associated with the authentic mobile application indicates that the subject mobile application is authentic;
    generating a notification based on the comparison to indicate authenticity of the subject mobile application, in which the subject mobile application is indicated to be the authentic mobile application or indicated to not be the authentic mobile application, wherein the authenticity of the subject mobile application comprises authenticity of the subject mobile application as received by the computing device from the source; and
    sending the notification to the computing device.

8. The system of claim 7, wherein the method further comprises receiving the information associated with the authentic mobile application from a mobile application provider.

9. The system of claim 7, wherein the information associated with the authentic mobile application comprises at least one of a first unique identity uniquely identifying a provider of the authentic mobile application, a second unique identity uniquely identifying the authentic mobile application, a version number of the authentic mobile application, a build number of the authentic mobile application and a checksum of the authentic mobile application.

10. The system of claim 7, wherein the one or more application details associated with the subject mobile application comprises at least one of a first unique identity uniquely identifying a provider of the subject mobile application, a second unique identity uniquely identifying the subject mobile application, a version number of the subject mobile application, a build number of the subject mobile application and a checksum of the subject mobile application.

11. The system of claim 7, wherein the method further comprises using the one or more application details associated with the subject mobile application to identify the stored information associated with the authentic mobile application stored for use in the comparing.

12. The system of claim 7, wherein the generating of the notification based on the comparing to indicate whether the subject mobile application is the authentic mobile application comprises generating the notification to indicate the subject mobile application being authentic based on the one or more application details associated with the subject mobile application matching with the stored information associated with the authentic mobile application.

13. A computer program product for indicating mobile application authenticity, the computer program product comprising:
    a non-transitory computer readable storage medium having program code embodied therewith, the program code executable by a processor to perform a method comprising:
        registering an authentic mobile application in a central registry of a computer system, the central registry for mobile applications, wherein the registration includes receiving and storing information associated with the authentic mobile application;
        receiving from a computing device one or more application details associated with a subject mobile application for which authenticity is to be indicated and installation is to be completed, the receiving being in association with the computing device downloading the subject mobile application from a source and prior to completion of installation of the subject mobile application, wherein the receiving the application details associated with the subject mobile application is based on presentation of an invitation to the computing device to download the subject mobile application from the source, activating an authentication module of the computing device, and triggering authentication of the subject mobile application with the central registry based on the computing device downloading the subject mobile application and initiating the installation thereof;
        comparing the received one or more application details associated with the subject mobile application with the stored information associated with the authentic mobile application, wherein a correlation between the received one or more application details associated with the subject mobile application and the stored information associated with the authentic mobile application indicates that the subject mobile application is authentic;
        generating a notification based on the comparison to indicate authenticity of the subject mobile application, in which the subject mobile application is indicated to be the authentic mobile application or indicated to not be the authentic mobile application, wherein the authenticity of the subject mobile application comprises authenticity of the subject mobile application as received by the computing device from the source; and
        sending the notification to the computing device.

14. The computer program product of claim 13, wherein the information associated with the authentic mobile application is received from a mobile application provider.

15. The computer program product of claim 13, wherein the information associated with the authentic mobile application comprises at least one of a first unique identity uniquely identifying a provider of the authentic mobile application, a second unique identity uniquely identifying the authentic mobile application, a version number of the authentic mobile application, a build member of the authentic mobile application and a checksum of the authentic mobile application.

16. The computer program product of claim 13, wherein the one or more application details associated with the subject mobile application comprises at least one of a first unique identity uniquely identifying a provider of the subject mobile application, a second unique identity uniquely identifying the subject mobile application, a version number of the subject mobile application, a build number of the subject mobile application and a checksum of the subject mobile application.

17. The computer program product of claim 13, wherein the method further comprises using the one or more application details associated with the subject mobile application to identify the stored information associated with the authentic mobile application stored for use in the comparing.

18. The computer program product of claim 13, wherein the generating of the notification based on the comparing to indicate whether the subject mobile application is the authentic mobile application comprises generating the notification to indicate the subject mobile application being authentic based on the one or more application details associated with the subject mobile application matching with the stored information associated with the authentic mobile application.

* * * * *